(12) United States Patent
Kagalwala et al.

(10) Patent No.: US 11,300,948 B2
(45) Date of Patent: Apr. 12, 2022

(54) PROCESS CONTROL OF SEMICONDUCTOR FABRICATION BASED ON SPECTRA QUALITY METRICS

(71) Applicants: GLOBALFOUNDRIES INC., Grand Cayman (KY); NOVA LTD., Rehovot (IL)

(72) Inventors: Taher Kagalwala, Clifton Park, NY (US); Alok Vaid, Clifton Park, NY (US); Shay Yogev, Kibbutz Kfar Menachem (IL); Matthew Sendelbach, Fishkill, NY (US); Paul Isbester, Castleton, NY (US); Yoav Etzioni, Tel-Aviv (IL)

(73) Assignees: NOVA LTD, Rehovot (IL); GLOBALFOUNDRIES INC., Grand Cayman (KY)

( * ) Notice: Subject to any disclaimer, the term of this patent is extended or adjusted under 35 U.S.C. 154(b) by 228 days.

(21) Appl. No.: 16/454,242

(22) Filed: Jun. 27, 2019

(65) Prior Publication Data
US 2020/0409345 A1   Dec. 31, 2020

(51) Int. Cl.
*G05B 19/418*   (2006.01)
*G05B 13/02*   (2006.01)

(52) U.S. Cl.
CPC ... *G05B 19/41875* (2013.01); *G05B 13/0265* (2013.01); *G05B 2219/32368* (2013.01); *G05B 2219/33034* (2013.01)

(58) Field of Classification Search
CPC ......... G05B 19/41875; G05B 13/0265; G05B 2219/33034; G05B 2219/32368; G05B 2219/45031
See application file for complete search history.

(56) References Cited

U.S. PATENT DOCUMENTS 6,161,054 A * 12/2000 Rosenthal ............. C23C 14/547
                                                          250/339.08
6,774,998 B1 * 8/2004 Wright ................. G03F 7/70633
                                                          356/399

(Continued)

*Primary Examiner* — Thomas C Lee
*Assistant Examiner* — Michael Tang
(74) *Attorney, Agent, or Firm* — Alphapatent Associates, Ltd.; Daniel J. Swirsky (57) ABSTRACT

A process control method for manufacturing semiconductor devices, including determining a quality metric of a production semiconductor wafer by comparing production scatterometric spectra of a production structure of the production wafer with reference scatterometric spectra of a reference structure of reference semiconductor wafers, the production structure corresponding to the reference structure, the reference spectra linked by machine learning to a reference measurement value of the reference structure, determining a process control parameter value (PCPV) of a wafer processing step, the PCPV determined based on measurement of the production wafer and whose contribution to the PCPV is weighted with a first predefined weight based on the quality metric, and based on a measurement of a different wafer and whose contribution to the PCPV is weighted with a second predefined weight based on the quality metric, and controlling, with the PCPV, the processing step during fabrication.

20 Claims, 4 Drawing Sheets

(56) References Cited

U.S. PATENT DOCUMENTS

| | | | |
|---|---|---|---|
| 2002/0085214 A1* | 7/2002 | Dautartas | G01B 11/065 356/630 |
| 2002/0090744 A1* | 7/2002 | Brill | G01N 23/225 438/11 |
| 2002/0165636 A1* | 11/2002 | Hasan | G05B 23/0216 700/121 |
| 2007/0142949 A1* | 6/2007 | Wang | G05B 13/024 700/108 |
| 2010/0141948 A1* | 6/2010 | Cohen | G01B 11/0625 356/369 |
| 2013/0060354 A1* | 3/2013 | Choi | G05B 13/04 700/51 |
| 2014/0242878 A1* | 8/2014 | Cherian | B24B 37/013 451/5 |
| 2015/0033201 A1* | 1/2015 | Vaid | H01L 22/00 716/135 |
| 2015/0115153 A1* | 4/2015 | Urbanowicz | G01N 23/00 250/307 |
| 2018/0108578 A1* | 4/2018 | Pandev | G03F 7/70625 |

* cited by examiner

PROCESS CONTROL OF SEMICONDUCTOR FABRICATION BASED ON SPECTRA QUALITY METRICS

BACKGROUND

Advanced semiconductor manufacturing technology requires extremely tight process control in order for the manufactured semiconductor devices to meet specifications. In the semiconductor industry, Advanced Process Control (APC) is often employed to actively control the manufacturing process using feedback and feedforward techniques. APC typically involves the measurement of one or more features/parameters of semiconductor devices on semiconductor wafers, as well as a set of algorithms designed to adjust those features/parameters, or ones related to them, on the wafers being measured and/or on subsequent wafers. The level of process control that APC algorithms can achieve depends, in part, on the measurement quality. Worse measurement quality will yield worse process control.

SUMMARY

In an aspect of the invention a method is provided for use in process control during manufacture of semiconductor devices on semiconductor wafers, the method including determining a quality metric of a production semiconductor wafer by comparing production scatterometric spectra of a production structure of the production semiconductor wafer with reference scatterometric spectra of a reference structure of one or more reference semiconductor wafers, where the production structure corresponds to the reference structure, and where the reference scatterometric spectra are linked by machine learning to a reference measurement value of the reference structure, determining a process control parameter value of a semiconductor wafer processing step, where the process control parameter value is determined a) based on a measurement of the production semiconductor wafer and whose contribution to the process control parameter value is weighted with a first predefined weight based on the quality metric, and b) based on a measurement of at least one different semiconductor wafer and whose contribution to the process control parameter value is weighted with a second predefined weight based on the quality metric, and controlling, with the process control parameter value, the semiconductor wafer processing step during semiconductor wafer fabrication.

In another aspect of the invention the reference scatterometric spectra include multiple sets of sets of scatterometric spectra collected from the reference semiconductor wafers, where each of the sets of reference scatterometric spectra is linked by machine learning to a reference measurement value of the reference structure.

In another aspect of the invention the quality metric is a measure of similarity of the production scatterometric spectra to the reference scatterometric spectra.

In another aspect of the invention the controlling includes providing the process control parameter value to an advanced process control system configured to control the semiconductor wafer processing step.

In another aspect of the invention the reference semiconductor wafer and the production semiconductor wafer are fabricated using an identical fabrication process, and where the reference scatterometric spectra and the production scatterometric spectra are collected at an identical point during the fabrication process.

In another aspect of the invention the at least one different semiconductor wafer is fabricated prior to fabrication of the production semiconductor wafer in a common lot of multiple semiconductor wafers representing a common product type.

In another aspect of the invention the process control parameter value is determined based additionally on a measurement of at least one additional semiconductor wafer and whose contribution to the process control parameter value is weighted with a third predefined weight based on the quality metric, and where the at least one additional semiconductor wafer is fabricated prior to fabrication of the production semiconductor wafer and in at least one different lot of multiple semiconductor wafers of the common product type.

In another aspect of the invention the at least one different lot is produced within a predefined time period prior to fabrication of the production semiconductor wafer.

In another aspect of the invention the process control parameter value is determined based additionally on a measurement of at least one different-product semiconductor wafer and whose contribution to the process control parameter value is weighted with a fourth predefined weight based on the quality metric, and where the at least one different-product semiconductor wafer is fabricated prior to fabrication of the production semiconductor wafer and in at least one different-product lot of multiple semiconductor wafers of a different product type.

In another aspect of the invention the at least one different-product lot is produced within a second predefined time period prior to fabrication of the production semiconductor wafer.

In another aspect of the invention a system is provided for use in process control during manufacture of semiconductor devices on semiconductor wafers, the system including a quality metric generator configured to determine a quality metric of a production semiconductor wafer by comparing production scatterometric spectra of a production structure of the production semiconductor wafer with reference scatterometric spectra of a reference structure of one or more reference semiconductor wafers, where the production structure corresponds to the reference structure, and where the reference scatterometric spectra are linked by machine learning to a reference measurement value of the reference structure, a process controller configured to determine a process control parameter value of a semiconductor wafer processing step, where the process control parameter value is determined a) based on a measurement of the production semiconductor wafer and whose contribution to the process control parameter value is weighted with a first predefined weight based on the quality metric, and b) based on a measurement of at least one different semiconductor wafer and whose contribution to the process control parameter value is weighted with a second predefined weight based on the quality metric, and control, with the process control parameter value, the semiconductor wafer processing step during semiconductor wafer fabrication.

In another aspect of the invention the reference scatterometric spectra include multiple sets of sets of scatterometric spectra collected from the reference semiconductor wafers, where each of the sets of reference scatterometric spectra is linked by machine learning to a reference measurement value of the reference structure.

In another aspect of the invention the quality metric is a measure of similarity of the production scatterometric spectra to the reference scatterometric spectra.

In another aspect of the invention the process controller is configured to provide the process control parameter value to an advanced process control system configured to control the semiconductor wafer processing step.

In another aspect of the invention the reference semiconductor wafer and the production semiconductor wafer are fabricated using an identical fabrication process, and where the reference scatterometric spectra and the production scatterometric spectra are collected at an identical point during the fabrication process.

In another aspect of the invention the at least one different semiconductor wafer is fabricated prior to fabrication of the production semiconductor wafer in a common lot of multiple semiconductor wafers representing a common product type.

In another aspect of the invention the process controller is configured to determine the process control parameter value based additionally on a measurement of at least one additional semiconductor wafer and whose contribution to the process control parameter value is weighted with a third predefined weight based on the quality metric, and where the at least one additional semiconductor wafer is fabricated prior to fabrication of the production semiconductor wafer and in at least one different lot of multiple semiconductor wafers of the common product type.

In another aspect of the invention the at least one different lot is produced within a predefined time period prior to fabrication of the production semiconductor wafer.

In another aspect of the invention the process controller is configured to determine the process control parameter value based additionally on a measurement of at least one different-product semiconductor wafer and whose contribution to the process control parameter value is weighted with a fourth predefined weight based on the quality metric, and where the at least one different-product semiconductor wafer is fabricated prior to fabrication of the production semiconductor wafer and in at least one different-product lot of multiple semiconductor wafers of a different product type.

In another aspect of the invention the production scatterometric spectra are measured by an integrated metrology system, and where the reference scatterometric spectra are obtained by a stand-alone metrology system employing conventional ML algorithms.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
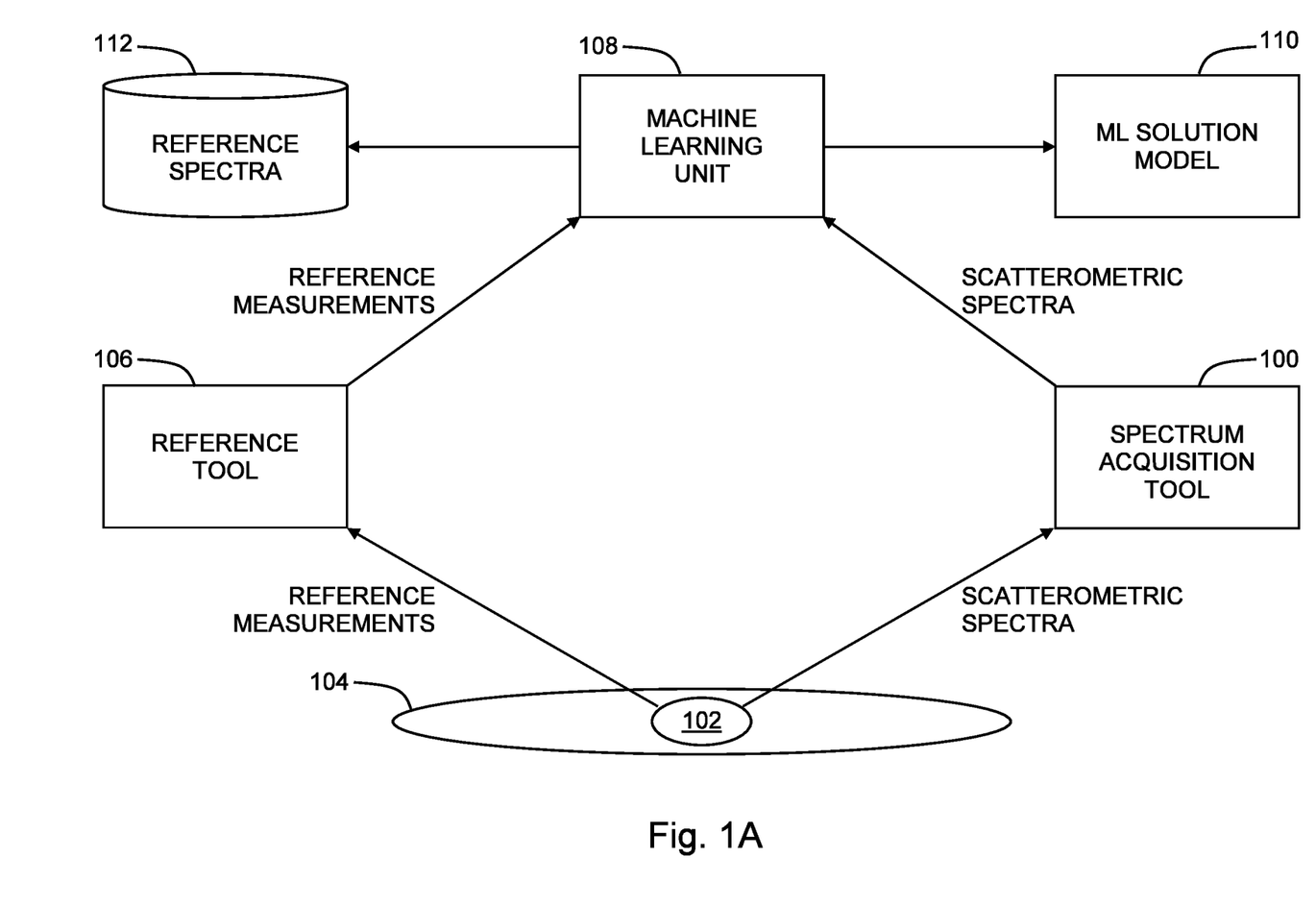
FIGS. 1A and 1B, taken together, is a simplified conceptual illustration of a system for process control of semiconductor fabrication, constructed and operative in accordance with an embodiment of the invention.
Figure 1B:
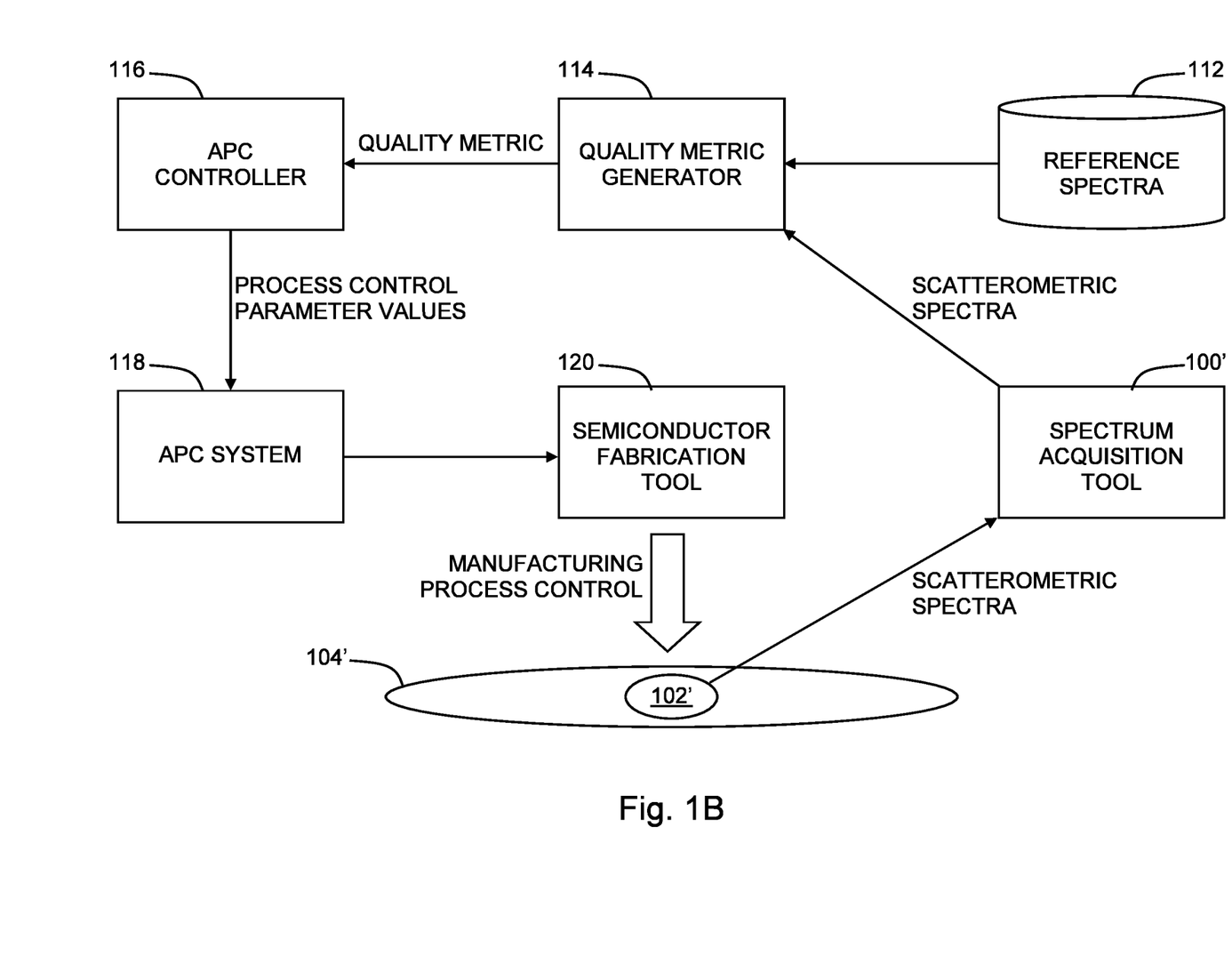

Reference is now made to FIGS. 1A and 1B, which, taken together, is a simplified conceptual illustration of a system for process control of semiconductor fabrication, constructed and operative in accordance with an embodiment of the invention. In FIG. 1A a spectrum acquisition tool 100, such as a Spectral Ellipsometer (SE), a Spectral Reflectometer (SR), or a Polarized Spectral Reflectometer, is employed to collect, in accordance with conventional techniques, one or more sets of scatterometric spectra of a reference structure 102, such as a fin structure of a Fin Field-effect transistor (FinFET), at a specific location on one or more reference semiconductor wafers 104, such as by performing spectrum photometry on reference structure 102. Spectrum acquisition tool 100 collects the scatterometric spectra of reference structure 102 at a selected point during fabrication of reference semiconductor wafers 104, such as just after completion of a given etch step, although any point during fabrication of reference semiconductor wafers 104 may be selected.

A reference tool 106, such as a Critical Dimension Scanning Electron Microscope (CD-SEM), an Atomic Force Microscope (AFM), or a Critical Dimension Atomic Force Microscope (CD-AFM), is employed to collect, in accordance with conventional techniques, reference measurements of reference structure 102 on reference semiconductor wafers 104 at the same selected point during fabrication of reference semiconductor wafers 104. The reference measurements may be any type of measurements of, or relative to, reference structure 102, such as critical dimension (CD), sidewall angle (SWA), height, and trench depth.

Spectrum acquisition tool 100 and reference tool 106 preferably obtain multiple scatterometric spectra and reference measurements for multiple reference structures 102 and at multiple selected points during fabrication of reference semiconductor wafers 104.

A machine learning unit 108 is configured to perform machine learning (ML) to identify links between any of the sets of scatterometric spectra and the reference measurements and thereby train an ML solution model 110 that represents the identified links. Machine learning unit 108 may employ any known ML technique suitable for identifying such links between any of the sets of scatterometric spectra and the reference measurements, such as where predefined statistical criteria are met indicating that particular scatterometric spectra of a given reference structure 102 at the selected point are statistically linked to particular reference measurements of the given reference structure 102 at the same selected point. ML solution model 110 is provided for use with process control apparatus configured to control manufacture of semiconductor devices on semiconductor wafers, as is now described with reference to FIG. 1B. Those scatterometric spectra that are found to be linked to reference measurements are preferably stored, such as in a data store 112 of reference spectra.

In FIG. 1B, a spectrum acquisition tool 100', which may be spectrum acquisition tool 100 or another similar or identical spectrum acquisition tool, is employed during a production process, such as during a high-volume manufacturing (HVM) process of fabricating semiconductor devices on semiconductor wafers, to collect scatterometric spectra of a production structure 102' on a production semiconductor wafer 104' at a selected point during fabrication of production semiconductor wafer 104', where the process used to fabricate production semiconductor wafer 104' and production structure 102' is preferably identical to the process described in FIG. 1A that is used to fabricate reference semiconductor wafer 104 and reference structure 102, such that production structure 102' corresponds to reference structure 102. Spectrum acquisition tool 100' collects scatterometric spectra of production structure 102' in the same manner that spectrum acquisition tool 100 in FIG. 1A used to collect scatterometric spectra of reference structure 102 at the same selected point during the fabrication of their respective wafers.

A quality metric generator 114 is configured to determine a quality metric for production semiconductor wafer 104' by comparing the scatterometric spectra collected by spectrum acquisition tool 100' of production structure 102' at the selected point with any, and preferably all, of the sets of reference scatterometric spectra 112 collected by spectrum acquisition tool 100' of production structure 102' at the same selected point and that were found to be linked to reference measurements as described hereinabove. The quality metric is preferably a measure of similarity of the production scatterometric spectra to the compared reference scatterometric spectra where such similarity may be determined in accordance with any known similarity determination method and metric.

An Advanced Process Control (APC) controller 116 is configured to determine, based on the quality metric determined for production semiconductor wafer 104', and in accordance with predefined decision-making protocols, a value, such as etch time or deposition rate, for one or more process control parameters of one or more semiconductor wafer processing steps used in fabricating production semiconductor wafer 104' and/or other wafers. APC controller 116 preferably determines a given process control parameter value (PCPV) based on one or more measurements of production semiconductor wafer 104', and optionally based on one or more measurements of one or more other semiconductor wafers that are fabricated prior to the fabrication of production semiconductor wafer 104'. These measurements used by APC controller 116 to determine process control parameter values include the scatterometric spectra collected by spectrum acquisition tool 100' of production structure 102' and/or any other type of measurement of production semiconductor wafer 104' and previously-fabricated wafers produced using metrology techniques as applied to semiconductor wafers, including, but not limited to, microscopy, scatterometry, and model-based techniques including optical critical dimension (OCD) metrology.

In one embodiment, such as where the value of quality metric is below a first threshold and/or falls within a first range of values, APC controller 116 determines the given process control parameter value based on measurements of production semiconductor wafer 104' and whose contribution to the value is weighted with a first predefined weight based on the quality metric, and on measurements of the one or more other semiconductor wafers and whose contribution to the value is weighted with a second predefined weight based on the quality metric, where production semiconductor wafer 104' and the other semiconductor wafers belong to the same "lot" of wafers of the same product type.

Optionally, such as where the value of quality metric is below a second threshold that is lower than the first threshold and/or falls within a second range of values, APC controller 116 determines the given process control parameter value also based on one or more measurements of one or more additional semiconductor wafers and whose contribution to the value is weighted with a third predefined weight based on the quality metric, where the additional semiconductor wafers are fabricated prior to fabrication of production semiconductor wafer 104' as part of one or more other lots of wafers of the same product type as that of production semiconductor wafer 104', such as were produced within a predefined time period prior to fabrication of production semiconductor wafer 104'.

Optionally, such as where the value of quality metric is below a third threshold that is lower than the second threshold and/or falls within a third range of values, APC controller 116 determines the given process control parameter value also based on one or more measurements of one or more other semiconductor wafers and whose contribution to the value is weighted with a fourth predefined weight based on the quality metric, where these other semiconductor wafers are fabricated prior to fabrication of production semiconductor wafer 104' as part of one or more other lots of wafers of a different product type than that of production semiconductor wafer 104', such as were produced within a predefined time period prior to fabrication of production semiconductor wafer 104'.

APC controller 116 preferably controls any wafer fabrication processing step associated with any process control parameter value determined as described above by providing any such value to an Advanced Process Control (APC) system 118 which controls semiconductor wafer fabrication in accordance with conventional techniques by providing such values as input to any known semiconductor manufacturing tool 120 (e.g., lithography tool, etch tool, deposition tool, etc.) for controlling operation of the tool during the fabrication of production semiconductor wafer 104' and/or other wafers. In one embodiment, APC system 118 is itself be configured to operate in the manner of APC controller 116 as described hereinabove.

Figure 2:
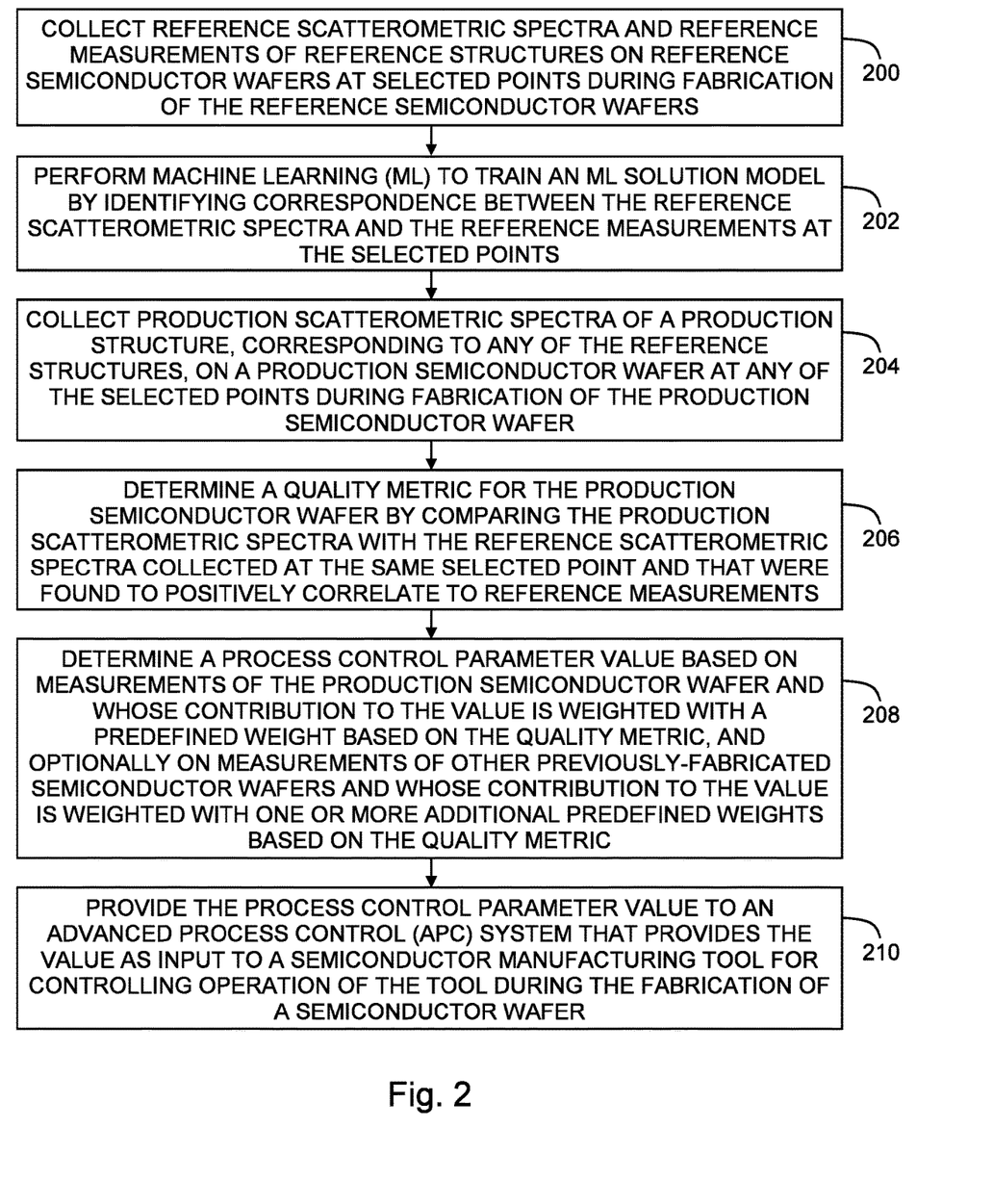
FIG. 2 is a simplified flowchart illustration of an exemplary method of operation of the system of FIGS. 1A and 1B, operative in accordance with an embodiment of the invention.

Reference is now made to FIG. 2 which is a simplified flowchart illustration of an exemplary method of operation of the system of FIGS. 1A and 1B, operative in accordance with an embodiment of the invention. In the method of FIG. 2, one or more sets of reference scatterometric spectra and reference measurements are collected from reference structures on one or more reference semiconductor wafers at selected points during fabrication of the reference semiconductor wafers (step 200). Machine learning (ML) is performed to train an ML solution model by identifying correspondence between any of the sets of reference scatterometric spectra and the reference measurements at the selected points (step 202). Production scatterometric spectra of a production structure, corresponding to any of the reference structures, on a production semiconductor wafer are collected at any of the selected points during fabrication of the production semiconductor wafer (step 204). A quality metric is determined for the production semiconductor wafer by comparing the production scatterometric spectra with any, and preferably all, of the sets of reference scatterometric spectra collected at the same selected point and that were found to be linked to reference measurements (step 206). A process control parameter value is determined based on measurements of the production semiconductor wafer and whose contribution to the value is weighted with a predefined weight based on the quality metric, and optionally on measurements of other previously-fabricated semiconductor wafers and whose contribution to the value is weighted with one or more additional predefined weights based on the quality metric (step 208). The process control parameter value is used to control an associated wafer fabrication processing step by providing the value to an Advanced Process Control (APC) system that provides the value as input to a semiconductor manufacturing tool for controlling operation of the tool during the fabrication of a semiconductor wafer (step 210).

Figure 3:
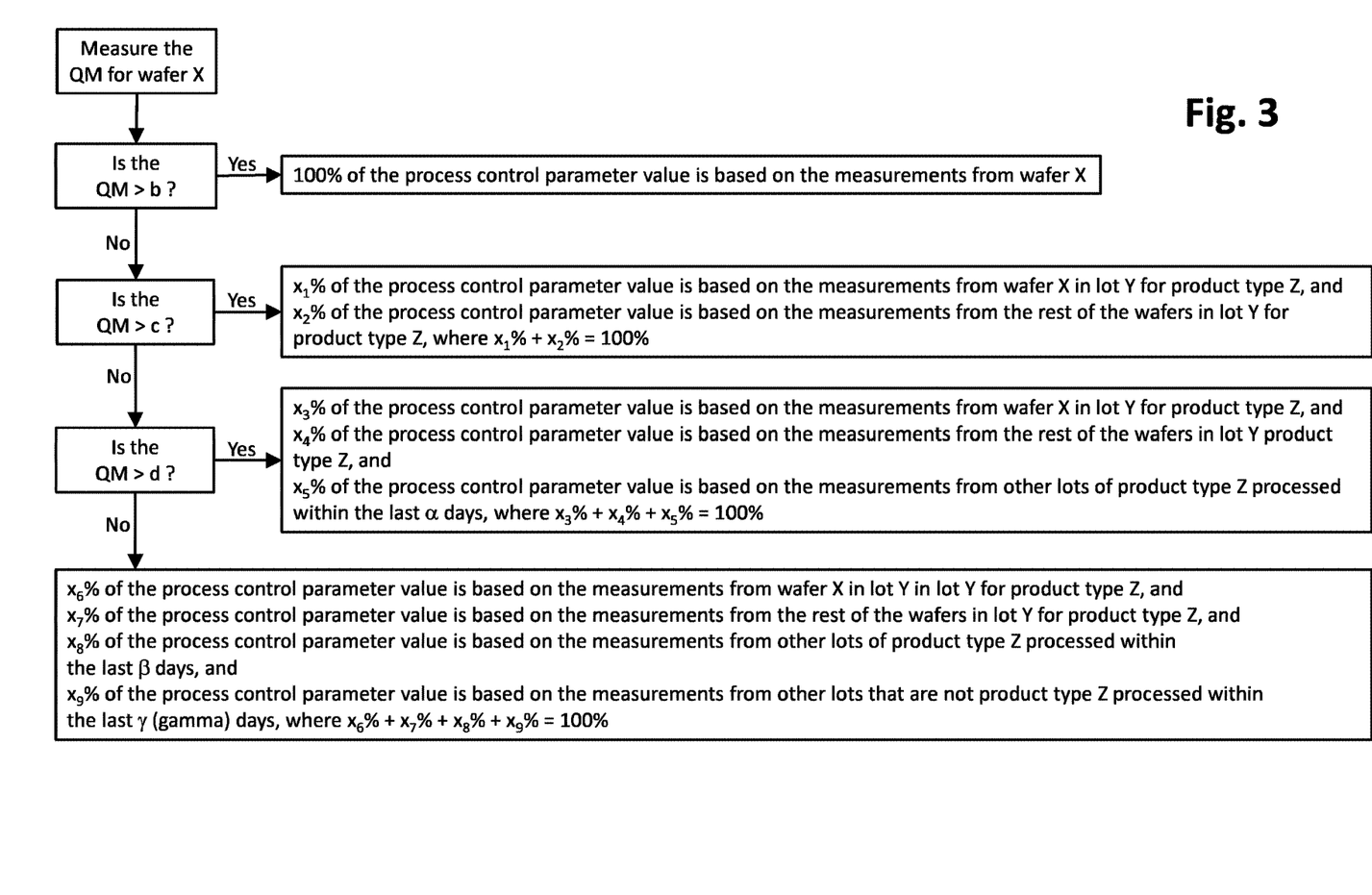
FIG. 3 is a simplified flowchart illustration of an exemplary method of operation of the system of FIG. 1B, operative in accordance with an embodiment of the invention.

Aspects of the system and method of the invention as described herein may be illustrated with respect to the flowchart shown in FIG. 3 in which a given process control parameter value is determined using different weighted contributions from different wafers based on various threshold values b, c, and d of a quality metric, where b indicates a threshold of a higher quality and c and d indicate thresholds of an increasingly lower quality. Thus, for example, given the following values for parameters b, c, d, such as for etch time, and weights $x_1$-$x_9$:

| Parameter | Value |
|---|---|
| b | 0.9 |
| c | 0.8 |
| d | 0.7 |
| $x_1$ | 0.50 |
| $x_2$ | 0.50 |
| $x_3$ | 0.40 |
| $x_4$ | 0.30 |
| $x_5$ | 0.30 |
| $x_6$ | 0.25 |
| $x_7$ | 0.25 |
| $x_8$ | 0.25 |
| $x_9$ | 0.25 | and the following process control parameter values in seconds:

| | | |
|---|---|---|
| p | 100 | process control parameter value (in seconds) based only on measurements from wafer X |
| q | 110 | process control parameter value (in seconds) based only on measurements from the rest of the wafers from lot Y (not including wafer X) |
| r | 115 | process control parameter value (in seconds) based only on measurements from other lots of product type Z (not including lot Y) |
| s | 90 | process control parameter value (in seconds) based only on measurements from other lots that are not product type Z | the resulting process control parameter values, such as of the number of seconds to be applied to a silicon trench etch process, at various QM levels may be determined as follows:

| For a QM that satisfies this condition | the process control parameter value used for wafer X (in seconds) is: | Formula |
|---|---|---|
| QM > 0.9 | 100 | =p |
| 0.8 < QM ≤ 0.9 | 105 | =(x1 * p) + (x2 * q) |
| 0.7 < QM ≤ 0.8 | 107.5 | =(x3 * p) + (x4 * q) + (x5 * r) |
| QM ≤ 0.7 | 103.75 | =(x6 * p) + (x7 * q) + (x8 * r) + (x9 * s) |

Any aspect of the invention described herein may be implemented in computer hardware and/or computer software embodied in a non-transitory, computer-readable medium in accordance with conventional techniques, the computer hardware including one or more computer processors, computer memories, I/O devices, and network interfaces that interoperate in accordance with conventional techniques.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart illustrations and block diagrams in the drawing figures illustrate the architecture, functionality, and operation of possible implementations of systems, methods, and computer program products according to various embodiments of the invention. In this regard, each block in the flowchart illustrations or block diagrams may represent a module, segment, or portion of computer instructions, which comprises one or more executable computer instructions for implementing the specified logical function(s). In some alternative implementations, the functions noted in a block may occur out of the order noted in the drawing figures. For example, two blocks shown in succession may, in fact, be executed substantially concurrently, or the blocks may sometimes be executed in the reverse order, depending upon the functionality involved. It will also be noted that each block of the flowchart illustrations and block diagrams, and combinations of such blocks, can be implemented by special-purpose hardware-based and/or software-based systems that perform the specified functions or acts.

The descriptions of the various embodiments of the invention have been presented for purposes of illustration, but are not intended to be exhaustive or limited to the embodiments disclosed. For example, the systems and methods described herein are applicable to any type of structure on semiconductor wafers. Many modifications and variations will be apparent to those of ordinary skill in the art without departing from the scope and spirit of the described embodiments.

What is claimed is:

1. A method for use in process control during manufacture of semiconductor devices on semiconductor wafers, the method comprising:
    determining a quality metric of a production semiconductor wafer by comparing production scatterometric spectra of a production structure of the production semiconductor wafer with reference scatterometric spectra of a reference structure of one or more reference semiconductor wafers,
        wherein the production structure corresponds to the reference structure, and
        wherein the reference scatterometric spectra are linked by machine learning to a reference measurement value of the reference structure;
    determining a process control parameter value of a semiconductor wafer processing step, wherein the process control parameter value is determined
        a) based on a measurement of the production semiconductor wafer and whose contribution to the process control parameter value is weighted with a first predefined weight based on the quality metric of the production semiconductor wafer, and
        b) based on a measurement of at least one different semiconductor wafer and whose contribution to the process control parameter value is weighted with a second predefined weight based on the quality metric of the production semiconductor wafer,
        wherein the measurement of the production semiconductor wafer and the measurement of at least one different semiconductor wafer include any of a) the production scatterometric spectra and b) any other type of measurement produced using metrology techniques applicable to semiconductor wafers; and
    controlling, with the process control parameter value, the semiconductor wafer processing step during semiconductor wafer fabrication.

2. The method according to claim 1 wherein the reference scatterometric spectra include multiple sets of sets of scatterometric spectra collected from the reference semiconductor wafers, wherein each of the sets of reference scatterometric spectra is linked by machine learning to a reference measurement value of the reference structure.

3. The method according to claim 1 wherein the quality metric is a measure of similarity of the production scatterometric spectra to the reference scatterometric spectra.

4. The method according to claim 1 wherein the controlling comprises providing the process control parameter value to an advanced process control system configured to control the semiconductor wafer processing step.

5. The method according to claim 1 wherein the reference semiconductor wafer and the production semiconductor wafer are fabricated using an identical fabrication process, and wherein the reference scatterometric spectra and the production scatterometric spectra are collected at an identical point during the fabrication process.

6. The method according to claim 1 wherein the at least one different semiconductor wafer is fabricated prior to fabrication of the production semiconductor wafer in a common lot of multiple semiconductor wafers representing a common product type.

7. The method according to claim 6 wherein the process control parameter value is determined based additionally on a measurement of at least one additional semiconductor wafer and whose contribution to the process control parameter value is weighted with a third predefined weight based on the quality metric, and
wherein the at least one additional semiconductor wafer is fabricated prior to fabrication of the production semiconductor wafer and in at least one different lot of multiple semiconductor wafers of the common product type.

8. The method according to claim 7 wherein the at least one different lot is produced within a predefined time period prior to fabrication of the production semiconductor wafer.

9. The method according to claim 8 wherein the process control parameter value is determined based additionally on a measurement of at least one different-product semiconductor wafer and whose contribution to the process control parameter value is weighted with a fourth predefined weight based on the quality metric, and
wherein the at least one different-product semiconductor wafer is fabricated prior to fabrication of the production semiconductor wafer and in at least one different-product lot of multiple semiconductor wafers of a different product type.

10. The method according to claim 9 wherein the at least one different-product lot is produced within a second predefined time period prior to fabrication of the production semiconductor wafer.

11. A system for use in process control during manufacture of semiconductor devices on semiconductor wafers, the system comprising:
a quality metric generator configured to determine a quality metric of a production semiconductor wafer by comparing production scatterometric spectra of a production structure of the production semiconductor wafer with reference scatterometric spectra of a reference structure of one or more reference semiconductor wafers,
wherein the production structure corresponds to the reference structure, and
wherein the reference scatterometric spectra are linked by machine learning to a reference measurement value of the reference structure;
a process controller configured to
determine a process control parameter value of a semiconductor wafer processing step, wherein the process control parameter value is determined
a) based on a measurement of the production semiconductor wafer and whose contribution to the process control parameter value is weighted with a first predefined weight based on the quality metric of the production semiconductor wafer, and
b) based on a measurement of at least one different semiconductor wafer and whose contribution to the process control parameter value is weighted with a second predefined weight based on the quality metric of the production semiconductor wafer,
wherein the measurement of the production semiconductor wafer and the measurement of at least one different semiconductor wafer include any of a) the production scatterometric spectra and b) any other type of measurement produced using metrology techniques applicable to semiconductor wafers, and
control, with the process control parameter value, the semiconductor wafer processing step during semiconductor wafer fabrication.

12. The system according to claim 11 wherein the reference scatterometric spectra include multiple sets of sets of scatterometric spectra collected from the reference semiconductor wafers, wherein each of the sets of reference scatterometric spectra is linked by machine learning to a reference measurement value of the reference structure.

13. The system according to claim 11 wherein the quality metric is a measure of similarity of the production scatterometric spectra to the reference scatterometric spectra.

14. The system according to claim 11 wherein the process controller is configured to provide the process control parameter value to an advanced process control system configured to control the semiconductor wafer processing step.

15. The system according to claim 11 wherein the reference semiconductor wafer and the production semiconductor wafer are fabricated using an identical fabrication process, and wherein the reference scatterometric spectra and the production scatterometric spectra are collected at an identical point during the fabrication process.

16. The system according to claim 11 wherein the at least one different semiconductor wafer is fabricated prior to fabrication of the production semiconductor wafer in a common lot of multiple semiconductor wafers representing a common product type.

17. The system according to claim 16 wherein the process controller is configured to determine the process control parameter value based additionally on a measurement of at least one additional semiconductor wafer and whose contribution to the process control parameter value is weighted with a third predefined weight based on the quality metric, and
wherein the at least one additional semiconductor wafer is fabricated prior to fabrication of the production semiconductor wafer and in at least one different lot of multiple semiconductor wafers of the common product type.

18. The system according to claim 17 wherein the at least one different lot is produced within a predefined time period prior to fabrication of the production semiconductor wafer.

19. The system according to claim 18 wherein the process controller is configured to determine the process control parameter value based additionally on a measurement of at least one different-product semiconductor wafer and whose contribution to the process control parameter value is weighted with a fourth predefined weight based on the quality metric, and
wherein the at least one different-product semiconductor wafer is fabricated prior to fabrication of the production semiconductor wafer and in at least one different-product lot of multiple semiconductor wafers of a different product type.

20. The system according to claim 11 wherein the production scatterometric spectra are measured by a metrology system integrated with a semiconductor wafer manufacturing system, and wherein the reference scatterometric spectra are obtained by a stand-alone metrology system employing conventional machine learning algorithms.

\* \* \* \* \*